United States Patent
Augier et al.

(10) Patent No.: US 10,363,494 B2
(45) Date of Patent: Jul. 30, 2019

(54) DEVICE FOR DISTRIBUTING GAS AND LIQUID IN CATALYTIC DISTILLATION COLUMNS

(71) Applicant: IFP Energies nouvelles, Rueil-Malmaison (FR)

(72) Inventors: Frederic Augier, Saint Symphorien D'Ozon (FR); Frederic Bazer-Bachi, Irigny (FR); Vincent Coupard, Villeurbanne (FR); Damien Leinekugel Le Cocq, Oullins (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 139 days.

(21) Appl. No.: 15/581,237

(22) Filed: Apr. 28, 2017

(65) Prior Publication Data

US 2017/0312650 A1    Nov. 2, 2017

(30) Foreign Application Priority Data

Apr. 29, 2016    (FR) ...................................... 16 53885

(51) Int. Cl.
*B01D 3/00*    (2006.01)

(52) U.S. Cl.
CPC ............. *B01D 3/009* (2013.01); *B01D 3/008* (2013.01)

(58) Field of Classification Search
CPC . B01D 3/008; B01D 3/009; B01D 3/00; B01J 8/02
See application file for complete search history.

(56) References Cited

U.S. PATENT DOCUMENTS

| 5,493,059 | A | 2/1996 | Sanfilippo et al. |
|---|---|---|---|
| 5,776,320 | A | 7/1998 | Marion et al. |
| 6,045,762 | A | 4/2000 | Chuang et al. |
| 6,149,879 | A | 11/2000 | Forestiere et al. |
| 2015/0086430 | A1 | 3/2015 | Shalupkin et al. |

OTHER PUBLICATIONS

French Search Report dated Oct. 7, 2016, issued in corresponding FR Application No. 16/53.885, 9 pages.

*Primary Examiner* — Renee Robinson
*Assistant Examiner* — Derek N Mueller
(74) *Attorney, Agent, or Firm* — Millen, White, Zelano and Branigan, P.C.

(57) ABSTRACT

The present invention describes a device for supplying the catalytic zone of a reactive distillation column using a liquid stream as the reaction stream, the flow of liquid in the reactive zone being of the upflow type and gas not encountering the liquid in the reactive zone.

9 Claims, 4 Drawing Sheets

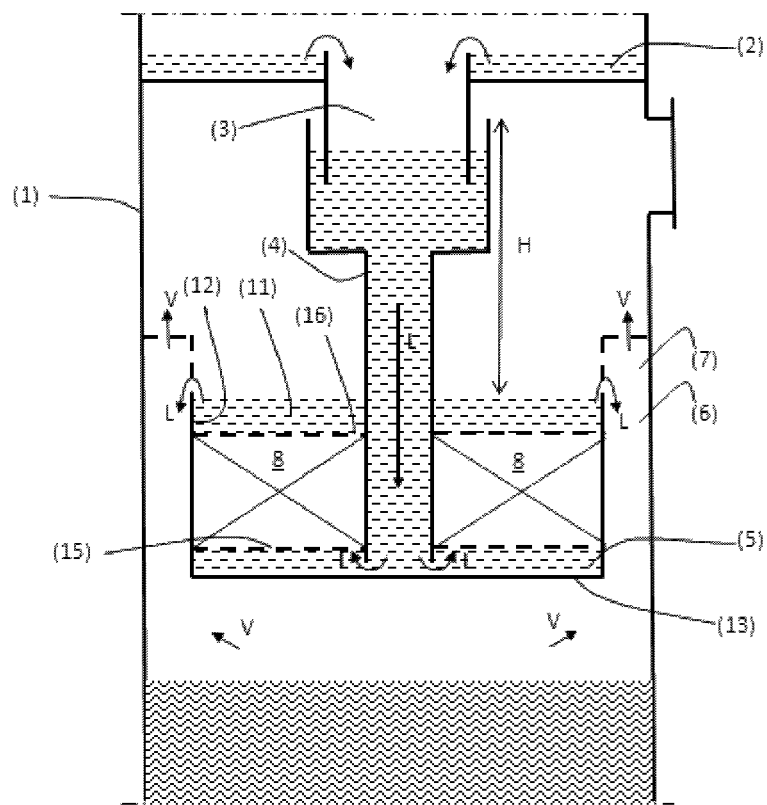
FIG. 2
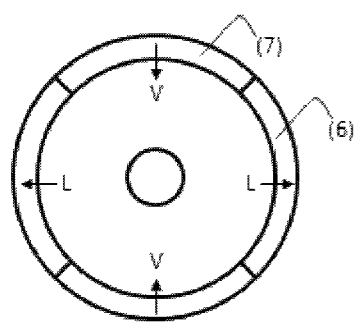
FIG. 2 bis

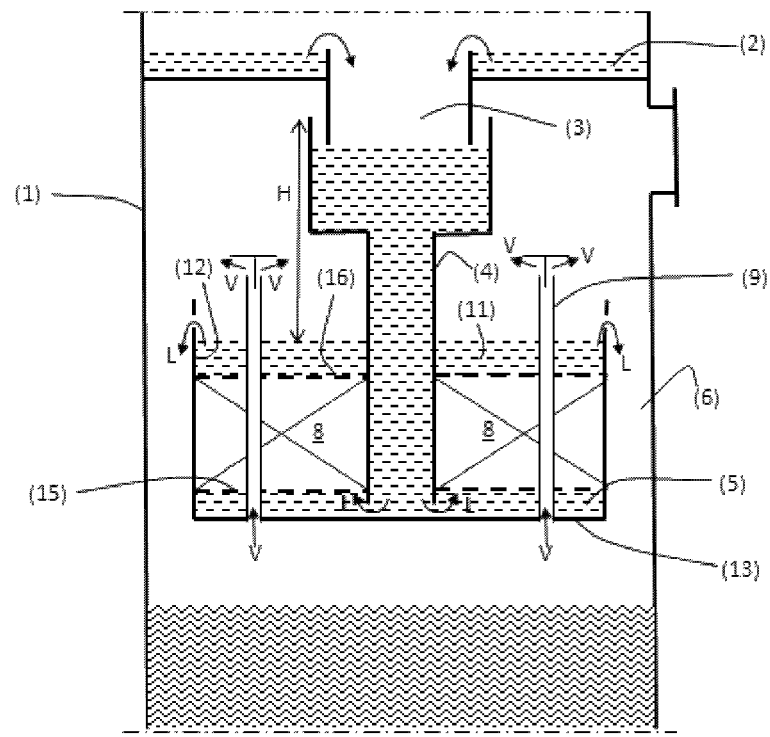
FIG. 3
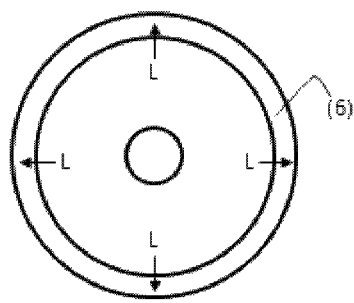
FIG. 3 bis

DEVICE FOR DISTRIBUTING GAS AND LIQUID IN CATALYTIC DISTILLATION COLUMNS

CONTEXT OF THE INVENTION

The object of the invention is the improvement of contact means used in reactive distillation columns. The term "contact means" is intended to mean any element for use in the distribution of gaseous and liquid fluids inside the catalytic zone. The term "catalytic zone plate" is used to denote the ensemble of the contact means and support elements for the catalytic bed.

Reactive distillation, also known as catalytic distillation, consists of carrying out a separation by distillation then a chemical reaction in the same equipment termed the reactive distillation column. This operation is particularly indicated for equilibrated reactions (for example A+B↔C+D), which are therefore incomplete. Thus, if one of the constituents is withdrawn during the reaction, the equilibrium will be displaced in the direction of formation of that constituent, thereby improving the reaction conversion.

In the remainder of the text, the terms "reactive column" or "catalytic column" will be used interchangeably.

In one embodiment of the reactive distillation column, it is formed as a succession of catalytic zones and distillation zones (see FIG. 1 for the general configuration of a reactive column).

In the context of the present invention, the gas and liquid meet only in the distillation zones and the catalytic zone only involves liquid. Thus, the gas has to bypass the catalytic zone without any contact with the liquid. In the remainder of the text, the term "bypass", which is well known to the person skilled in the art, will be used to signify circumvention.

The novel layout of the contact means described in the present invention differs from that of the prior art in the provision of a central collector distributing the liquid upstream of the catalytic zone, which means that it can accept large variations in liquid flow rate without flooding the catalytic zone.

BRIEF DESCRIPTION OF THE DRAWINGS

FIG. 2 represents a diagrammatic view of a reactive column plate in accordance with the invention. FIG. 2 shows a liquid supply zone constituted by an element which is cylindrical or parallelepipedal (3) then tubular (4), located at the centre of the column, which supplies the liquid to the distribution zone (5) located at the bottom of the catalytic zone.

Figure 1:
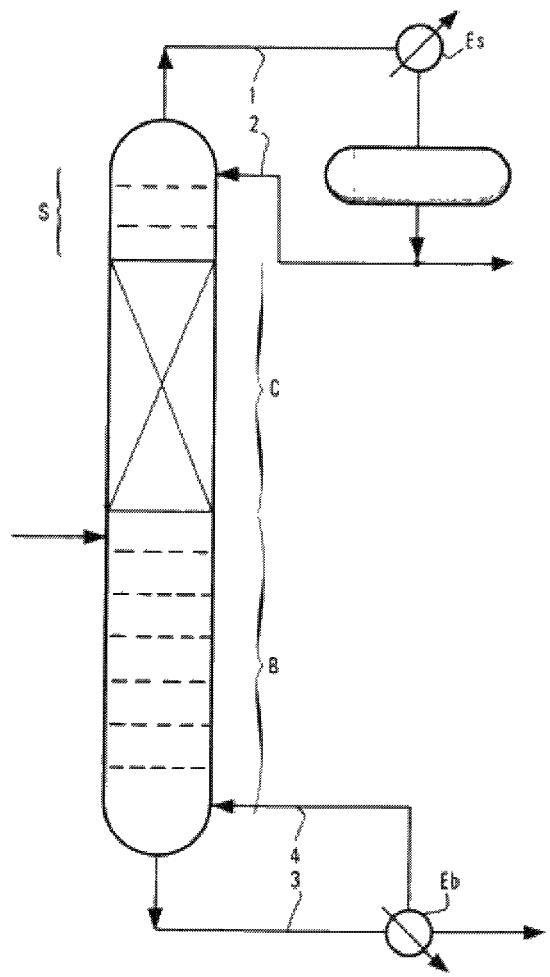
FIG. 1 is a diagrammatic representation of a catalytic distillation column which can be used to visualize the alternating distillation zones and reactive zones. A column may comprise a plurality of reactive zones alternating with a plurality of distillation zones.

The liquid passes through the catalytic zone (8) in upflow mode and is then evacuated from said zone via a weir (12).

The liquid rejoins the distillation zone downstream, passing through a dedicated peripheral zone (6).

The gas moves in a dedicated peripheral zone (7) which is completely separate from the peripheral zone for liquid (6) via solid vertical walls, as can be seen in FIG. 2 bis, which is a section of the catalytic column through the level of the catalytic zone, allowing the portion of the peripheral zone dedicated to liquid (6) and the portion of the peripheral zone dedicated to gas (7) to be visualized.

FIG. 2 bis is a top view which allows the peripheral zone dedicated to gas (7) and the peripheral zone dedicated to liquid (6) to be visualized.

FIG. 3 represents a variation of the invention in which the gas no longer moves via the dedicated peripheral zone (7), but rather via an array of vents (9) which pass through the catalytic zone (8).

FIG. 3 bis is a top view which allows the peripheral zone dedicated to liquid (6) to be visualized.

Figure 4:
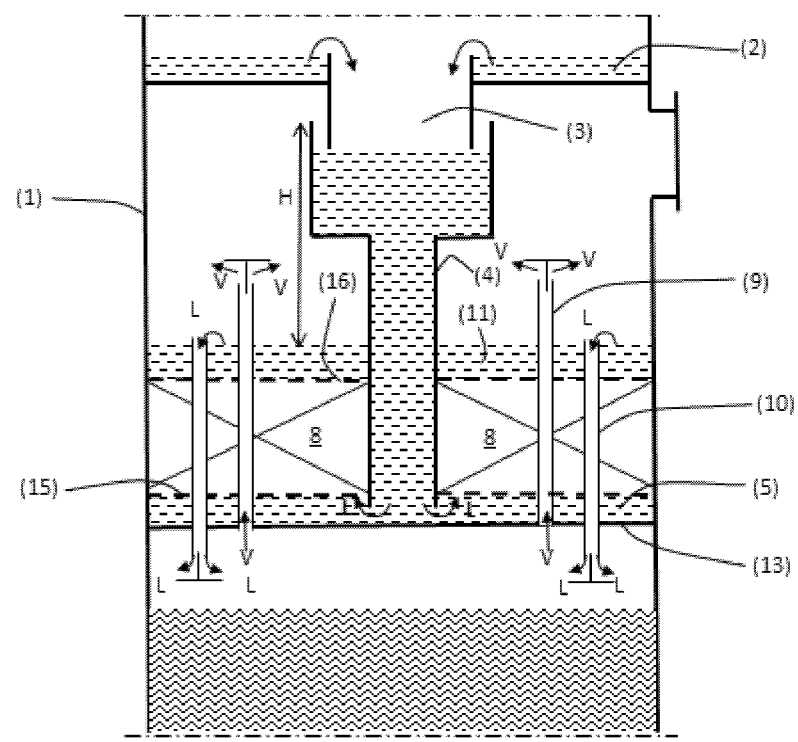

FIG. 4 represents another variation of the present invention, in which the liquid is no longer evacuated from the catalytic zone via the dedicated peripheral zone (6), but via an array of vents (10) passing through the catalytic zone (8) and intercalated between the arrayed gas bypass vents (9).

The fact that the variations are mutually compatible means that they may be combined. As an example, the scope of the invention encompasses using the array of vents (9) for gas and continuing to evacuate the liquid via the dedicated peripheral zone (6), or evacuating the liquid via the array of vents (10) and at the same time bypassing the catalytic zone (8) for gas by means of the dedicated peripheral zone (7).

EXAMINATION OF THE PRIOR ART

The prior art in the field of reactive columns is essentially represented by the document FR 2 737 132. That text describes the general layout of a reactive column and, more particularly, describes the path followed by the liquid in the catalytic zone. It does not mention any devices that could accommodate large variations in the liquid and/or gas flow rate.

The contact means described in the patent FR 2 737 132 can be summarized as follows:

A catalytic zone (C) is surrounded by two distillation zones (B), the vapour from distillation moving from bottom to top in a manner such that it substantially does not come into contact with the catalyst, and the liquid moves from the upper distillation zone (5) to a substantially central zone located below the catalytic zone by means of a central collector which is tapered then cylindrical in shape and which brings the liquid below the catalytic zone.

The liquid then moves radially below said catalytic zone (8) via a radial conduit type means so that it is introduced into a liquid distribution zone.

From this distribution zone, the liquid moves through the catalyst in the catalytic zone in an ascending or upflow direction, then the liquid is recovered, via at least one liquid overflow means, at the lower distillation zone.

The catalytic zone is topped by a certain layer of liquid which ensures the supply to the overflow means.

The liquid supply for the catalytic zone has only reduced flexibility because a liquid level is established in the central collector and, if that is exceeded, the catalytic zone is invaded by the liquid.

In the remainder of the text, the terms "upflow" and "downflow" will often be used to respectively designate ascending or descending flows of liquid.

BRIEF DESCRIPTION OF THE INVENTION

The present invention may be defined as a reactive distillation column constituted by alternating catalytic zones (8) and distillation zones in which, at each of the catalytic zones (8), the liquid is introduced upstream of said zone via a central liquid collector comprising a first cylindrical portion (3) followed by a second tubular portion (4), which brings the liquid into a liquid distribution zone (5) located below the catalytic zone (8).

This liquid distribution zone (5) generally has the same section as said catalytic zone (8), the liquid then passing through the catalytic zone in upflow mode and being evacuated from said catalytic zone via a peripheral zone (6) abutting the wall of the column, or via a system of vents (10) passing through the catalytic zone.

The gas from the downstream distillation zone bypasses the catalytic zone (8) via a dedicated peripheral zone (7) or via an array of vertical vents (9) which discharge above the upper level of liquid weirs (12).

The central collector (3) is provided with an overflow device the height H of which is defined as a function of the liquid pressure drops across the plate (15) and the catalytic bed (8).

When the gas bypasses the catalytic zone (8) by means of the array of vents (9), the number of vents (9) per unit section of the catalytic zone is in the range 1 to 20 vents/m$^2$, preferably in the range 2 to 15 vents/m$^2$.

When the liquid is evacuated from the catalytic zone (8) by means of an array of vents (10) interposed between the array of gas vents (9), the number of liquid evacuation vents (10) is in the range 20 to 200 vents/m$^2$, preferably in the range 100 to 150 vents/m$^2$.

The various possibilities for the gas to bypass the catalytic zone (8) and for evacuating liquid may be combined together, i.e.:
  evacuation of liquid via the dedicated peripheral zone (6) and bypass of the catalytic zone by the gas by means of the array of vents (9) in accordance with FIG. 3.
  evacuation of liquid via the array of vents (10) and bypass of the catalytic zone by the gas by means of the dedicated peripheral zone (7).
  evacuation of liquid via the array of vents (10) and a bypass of the catalytic zone by the gas by means of the array of vents (9) in accordance with FIG. 4.

DETAILED DESCRIPTION OF THE INVENTION

The configuration of the reactive column in accordance with the invention is based upon two concepts:
1) the liquid passing through the catalytic zone in upflow mode, and
2) the gas bypassing the catalytic zone and moving through a dedicated peripheral zone or through vents, and thus encountering the liquid at the level of the catalytic zone.

Contact between the liquid phase and the gas phase takes place solely at the distillation zones which surround the catalytic zone. These distillation zones will not be described in further detail here as they are not substantially different from those of the prior art.

More precisely, the present invention can be defined as a reactive distillation column constituted by alternating catalytic zones (8) and distillation zones (B). Each catalytic zone is thus surrounded by an upstream distillation zone and a downstream distillation zone.

The general disposition of the distillation zones and the catalytic zones as shown in FIG. 1 is no different from that of the prior art.

In the context of the present invention, each catalytic zone is the seat of a reaction with the liquid phase only, and the flow of said liquid phase through the catalytic layer is an upflow.

The remainder of the description is made with reference to FIG. 2, in accordance with the invention.

The liquid from the upstream distillation zone is recovered in a central liquid collector (3) comprising a first cylindrical or parallelepipedal portion (3) followed by a second tubular portion (4) which supplies the liquid to a liquid distribution zone (5) located below the catalytic zone (8) defined by the bottom (13) of said catalytic zone.

The liquid then passes through a screen (15) which generates a certain pressure drop which is taken into account in the dimensions of the overflow device of the central collector (3).

The catalytic bed may either be supported directly by the screen (15) or be supported by a second screen, with a small pressure drop, located just above the screen (15) (a variation, not shown in FIG. 2).

In accordance with a variation of the present invention, represented in FIG. 2, the liquid then passes through the catalytic zone (8) in upflow mode and is evacuated from said catalytic zone by overflowing over the lateral wall (12), which means that an upper liquid layer (11) can be defined. This wall (12) will hereinafter be termed the weir.

Liquid is transferred to the downstream distillation zone via a dedicated peripheral zone (6) abutting the wall of the column.

In accordance with another variation of the present invention, shown in FIG. 4, the liquid passes through the catalytic zone (8) as an upflow and is evacuated from said catalytic zone by overflowing into the vents (10). The level of the open upper end of the vents (10) means that an upper liquid layer (11) can be defined. Liquid is then transferred to the downstream distillation zone via the vents (10).

The gas from the downstream distillation zone bypasses the catalytic zone (8) either via a dedicated peripheral zone (7) or via an array of vertical vents (9) which discharge above the upper level of the liquid weir (12), as can be seen in FIG. 3.

The central collector (3) is equipped with an overflow device the height H of which is defined as a function of the liquid pressure drops across the lower plate (15) supporting the catalytic bed and the catalytic bed itself (8). H is the maximum height of liquid between the overflow level of the liquid layer (11) and the top of the overflow device of the central collector (3). This overflow device may be composed of two different elements of the section, that with the smallest section being positioned above the other.

In accordance with a first variation of the present invention, shown in FIG. 3, the gas bypasses the catalytic zone not by means of the dedicated peripheral zone (7), but by means of a system of vents (9) passing through the catalytic zone (8), and discharging at a level located above the level of the weir (12). The vents (9) for the passage of gas are preferably in either a square or a triangular pattern.

The number of vents (9) per unit section of the catalytic zone is preferably in the range 1 to 20 vents/m$^2$, and more preferably in the range 2 to 15 vents/m$^2$.

This means that the gas can be supplied to the foot of the upstream distillation zone in a substantially homogeneous manner.

In accordance with another variation of the distillation column in accordance with the invention, after passing through the catalytic zone (8), the liquid is returned to the downstream distillation zone, passing through a dedicated peripheral zone (6) separated by solid walls from the dedicated peripheral zone (7) for gas when said peripheral zone is used for the passage of gas. The compartmentalization of the peripheral zones dedicated to gas (7) on the one hand and those for liquid (6) on the other hand can be seen in the top view of FIG. 2 bis.

In accordance with another variation of the present invention, the liquid is evacuated from the catalytic zone (8) via an array of vents (10) interposed between the arrayed gas vents (9), when this array of gas vents exists. This variation with an array of vents (9) for bypassing the gas and an array of vents (10) for evacuating liquid is represented in FIG. 4.

In this variation, the vents (10) for return of liquid are preferably in either a square or a triangular pattern. The number of vents (10) per unit section of the catalytic zone is preferably in the range 20 to 200 vents/m$^2$, more preferably in the range 100 to 150 vents/m$^2$.

This means that the liquid can be distributed to the head of the lower distillation zone in a substantially homogeneous manner.

The flow of liquid in the vents (10) is a downflow and can be used to return the liquid upstream of the distillation zone located below the catalytic zone.

In this case, a packing is preferably used as the contactor between the gas and liquid at the level of the downstream distillation.

The scope of the present invention encompasses combining the different variations, i.e.:
With an evacuation of liquid via the dedicated peripheral zone (6) and a bypass of the catalytic zone by the gas by means of the array of vents (9) in accordance with FIG. 3.
With an evacuation of liquid via the array of vents (10) and a bypass of the catalytic zone by the gas by means of the dedicated peripheral zone (7).
With an evacuation of liquid via the array of vents (10) and a bypass of the catalytic zone by the gas by means of the array of vents (9) in accordance with FIG. 4.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 16/53.885 filed Apr. 29, 2016 are incorporated by reference herein.

COMPARATIVE EXAMPLES

Example 1 is based on a prior art column with a normal capacity.

Example 2 is based on a column in accordance with the invention with a normal capacity.

Example 3 is based on a prior art column at 110% capacity.

Example 4 is based on a column in accordance with the invention at 110% capacity.

The comparisons should thus be made between 1 and 2 for a normal capacity operation, and between 3 and 4 for an operation with an overcapacity of 10%.

The column in accordance with the invention had a central collector (3) provided with an overflow device the height H of which was defined as a function of the liquid pressure drops across the plate (15) and the catalytic bed (8), the height H being precisely defined as the maximum height of liquid between the overflow level of the liquid layer (11) and the height of the overflow device of the central collector (3).

The principal dimensions of the column were as follows:
Total height between two plates, i.e. between the collector plate and the plate termed the distillation plate: 2.5 m
Diameter: 1.20 m
Height of one catalytic bed: 0.5 m
Height H: 0.65 m
Evacuation of liquid via peripheral zone (6)
Bypass of gas via dedicated peripheral zone (7)

The reactive column was used in a process for the etherification of a C4 cut containing olefins (1-butene, cis-2-butene, trans-2-butene, isobutene), and paraffins (n-butane, isobutane).

This reactive column comprised 5 reactive doublets. The term "doublet" is applied to the assembly of an upper distributor plate, the downstream catalytic bed and the adjacent distillation zone downstream of the catalytic bed. A doublet corresponds to one theoretical plate for distillation.

The column comprised 33 theoretical plates including the reboiler (conventionally plate 33) and the condenser (conventionally plate 1). The feed was introduced into plate 24, and the catalytic beds were located between theoretical plates 5 and 6, 7 and 8, 9 and 10, 11 and 12 and 13 and 14.

The pressure at the head of the column was maintained at 790 kPa, the temperature was 67.2° C. overhead and 152° C. at the reboiler.

The feed for the reactive distillation column had the composition given in Table 1 below:

TABLE 1

| Composition of feed for catalytic column | |
|---|---|
| Composition of feed | % by weight |
| IC4 | 15.910% |
| IBTE | 3.160% |
| 1BUTENE | 16.300% |
| NC4 | 6.340% |
| BTT2 | 11.930% |
| BTC2 | 8.670% |
| IC5 | 1.550% |
| ETBE | 31.950% |
| ETOH | 3.580% |
| TBA | 0.610% |

The performance of the catalytic column was a function of its operating capacity and of the type of contact means used.

The examples were based on a digital simulation which had already been computed on the basis of an analogous industrial case.

The Proll simulation software was used to carry out the simulations.

The reaction kinetics for the etherification reaction were based on the study published in "Kinetics and mechanism of ethyl tert-butyl ether liquid-phase synthesis, Franoisse, O. Chemical Engineering and Processing: Process Intensification Volume: 30 Issue 3 (1991) ISSN: 0255-2701 Online ISSN: 1873-3204".

Examples 1 and 3 correspond to cases using a catalytic distillation contact means in accordance with the prior art,
with an operating capacity of 100% for Example 1. The reservoir 3 of the dimensioning doublet was thus full, but without overflow;
with an overcapacity (110% of load) for Example 3.

The computation shows that the highest doublet in the column, i.e. doublet 1, had the highest liquid flow rate during operation at 100%, which then "overflowed" in Example 3 with an overcapacity of 110%.

Examples 2 and 4 were carried out with a contact means in accordance with FIG. 2 of the invention, with an operating capacity of 100% for Example 2. The reservoir (3) of the dimensioning doublet was then full, but without overflow;

with an overcapacity (110%) of the feed) for Example 4.

The computation shows that the highest doublet in the column, i.e. doublet 1, functioned with a flow rate of 10% of the internal liquid passing into the upper reservoir (3) via the device in accordance with the invention.

The comparison of the results is shown in Table 2 below:

TABLE 2

Result of simulation between a catalytic column using a contact means in accordance with the prior art or in accordance with the invention

| | | Example N° | | | |
|---|---|---|---|---|---|
| | | 1 | 2 | 3 | 4 |
| Reflux/feed | wt/wt | 0.46 | 0.46 | 0.46 | 0.46 |
| Relative pressure, head | bar | 7.20 | 7.20 | 7.20 | 7.20 |
| Delta P column | kPa | 50.00 | 50.00 | 175.00 | 57.00 |
| T bottom | ° c. | 152.00 | 152.00 | 163.00 | 157.00 |
| Isobutene conversion | % by weight | 50.00% | 50.00% | 45.00% | 51.00% |
| EtOH head | % by weight | 0.81% | 0.81% | 1.06% | 1.00% |
| EtOH bottom | % by weight | 5.39% | 5.39% | 5.40% | 5.13% |
| Supply flow rate | kg/h | 25 650 | 25 650 | 28 215 | 28 215 |
| Bottom flow rate | kg/h | 9 600 | 9 600 | 10 483 | 10 571 |
| Distillate flow rate | kg/h | 16 050 | 16 050 | 17 732 | 17 644 |

The advantage of a column in accordance with the invention is especially apparent in the case of the overcapacity operation, i.e. by comparing Examples 3 and 4.

In fact, in the case in accordance with the prior art (Example 3), with a 110% regime, the absence of overflow did not allow the excess liquid to flow. This then generated an overpressure and a degradation of the separating power of the column. The bottom product was entrained towards the top of the column, compromising the operation in terms of conversion.

Ethanol was also lost from the bottom of the column due to the loss of separation and conversion. The extraction flow rate increased overall because of the ETBE, a reaction product, more of which was separated overhead. The operation was not satisfactory in this instance.

In the case in accordance with the invention (Example 4), with a 110% regime, the increase in capacity generated an overpressure limited to a few kPa. This reheating caused a very slight rise in the catalytic conversion. This rise in conversion compensated for the liquid bypass of the catalyst via the device in accordance with the invention.

In addition, the contact means in accordance with the invention could be used to maintain the light/heavy separation of the column when operated in doublet overcapacity. There was no rise of ETBE in the overhead effluent from the column, and overall the same head and bottom distribution was observed as in the case of operation without overcapacity.

Considering Examples 1 and 2 for the normal capacity operation, it could be wrongly concluded that the invention did not provide an improvement. However, in fact, 100% operation is the normal condition, often going over to 110% or even 120%. For this reason then, overall, the device in accordance with the invention provides better more operational safety.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactive distillation column comprising alternating catalytic zones (8) and distillation zones (B) in which:

at each of the catalytic zones (8), a liquid is introduced upstream of said catalytic zones (8) via a central liquid collector comprising a cylindrical or parallelepipedal portion (3) followed by a tubular portion (4) which brings the liquid into a liquid distribution zone (5) located below the catalytic zones (8), said distribution zone (5) having a cross-section that is the same as said catalytic zone, the liquid then passing through the catalytic zone in upflow mode and being evacuated from said catalytic zone via a peripheral zone (6) abutting a wall of the column or via a system of vents (10) passing through the catalytic zone, a gas bypasses a catalytic zone (C) via a dedicated peripheral zone (7) or via an array of vertical vents (9) which discharge above an upper level of liquid weirs (12), the central collector (3) being provided with an overflow device the height H of which, precisely defined as the maximum height of liquid between a level in the weirs (12) of a liquid layer (11) and the top of the overflow device of the central collector (3), has a value of 0.2 m to 2 m.

2. The reactive distillation column as claimed in claim 1, in which the liquid is evacuated via said peripheral zone (6), and the catalytic zone is bypassed by the gas through the array of vertical vents (9).

3. The reactive distillation column as claimed in claim 1, in which the liquid is evacuated via the system of vents (10), and the catalytic zone is bypassed by the gas through the array of vertical vents (9).

4. The reactive distillation column as claimed in claim 1, in which the number of vertical vents (9) allowing the gas to bypass the catalytic zone per unit section of the catalytic zone is 1 to 20 vents/m$^2$.

5. The reactive distillation column as claimed in claim 1, in which the liquid is evacuated from the catalytic zone via the system of vents (10) and the catalytic zone is bypassed by the gas by means of the dedicated peripheral zone (7).

6. The reactive distillation column as claimed in claim 1, in which the liquid is evacuated from the catalytic zone via the system of vents (10) and the catalytic zone is bypassed by the gas by means of the array of vertical vents (9), the system of vents (10) being interposed between the array of vertical vents (9).

7. The reactive distillation column as claimed in claim 6, in which the number of liquid evacuation vents (10) is 20 to 200 vents/m$^2$.

8. The reactive distillation column as claimed in claim 1, wherein the top of the overflow device of the central collector (3) has a value of 0.3 m to 1 m.

9. The reactive distillation column as claimed in claim 6, in which the number of liquid evacuation vents (10) is 100 to 150 vents/m$^2$.

* * * * *